Dec. 11, 1962  D. J. HALSEY ET AL  3,067,973
EJECTABLE FLIGHT CAPSULE
Filed March 15, 1961  3 Sheets-Sheet 1
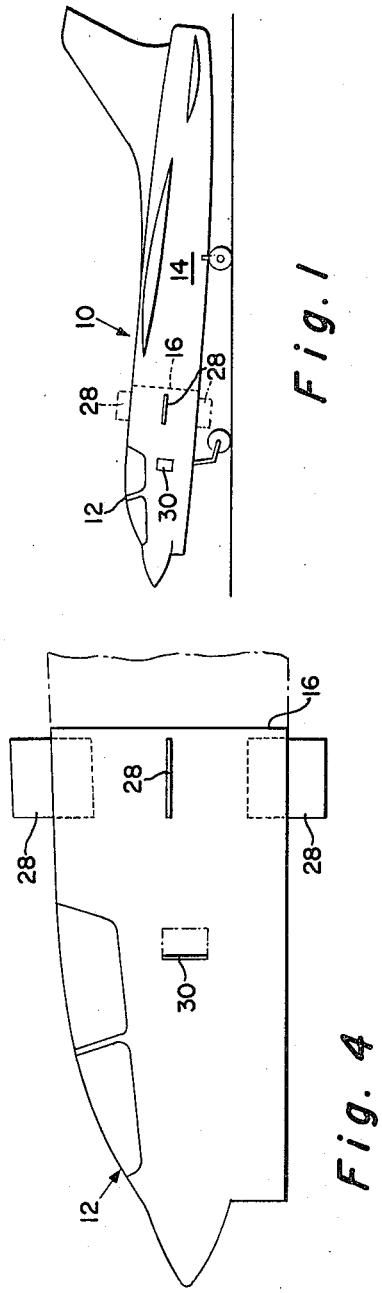
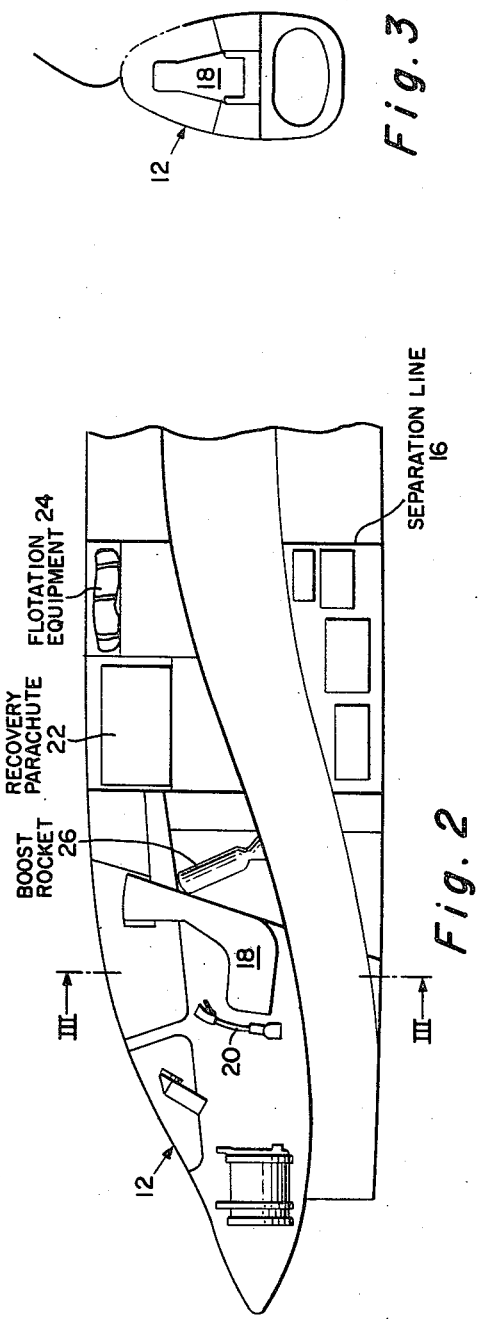
INVENTORS.
DONALD J. HALSEY
REX M. SELLS JR.
BY
Howard J. Murray, AGENT
George J. Ruben, ATTORNEY Dec. 11, 1962   D. J. HALSEY ET AL   3,067,973
EJECTABLE FLIGHT CAPSULE
Filed March 15, 1961   3 Sheets-Sheet 2

INVENTORS
DONALD J. HALSEY
REX M. SELLS JR.
BY
           AGENT
           ATTORNEY

Dec. 11, 1962  D. J. HALSEY ET AL  3,067,973
EJECTABLE FLIGHT CAPSULE
Filed March 15, 1961  3 Sheets-Sheet 3
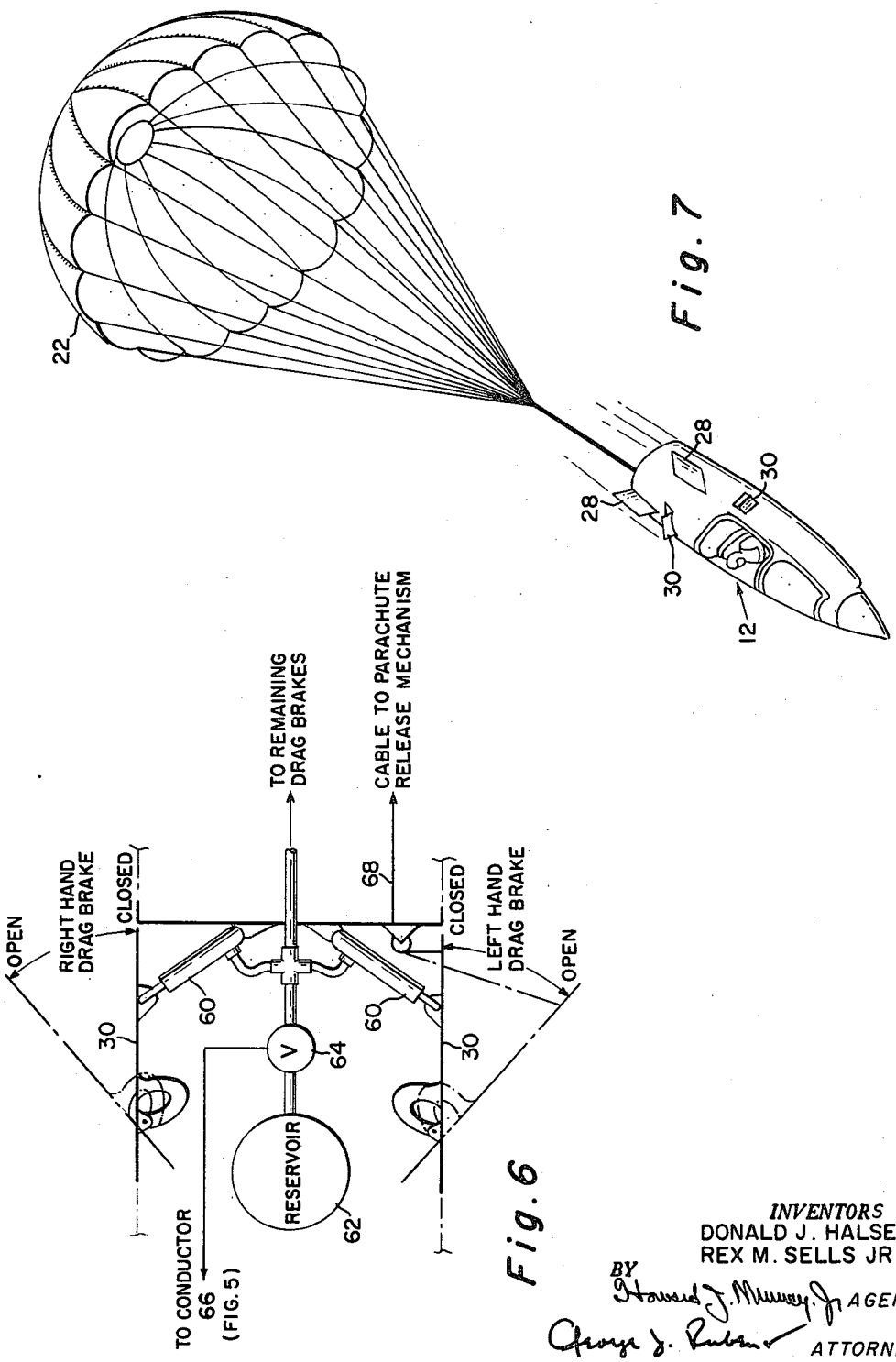
INVENTORS
DONALD J. HALSEY
REX M. SELLS JR.
BY
AGENT
ATTORNEY

United States Patent Office 3,067,973
Patented Dec. 11, 1962

3,067,973
EJECTABLE FLIGHT CAPSULE
Donald J. Halsey, Arlington, and Rex M. Sells, Jr., Dallas, Tex., assignors, by mesne assignments, to the United States of America as represented by the Secretary of the Navy
Filed Mar. 15, 1961, Ser. No. 96,056
6 Claims. (Cl. 244—140)

The present invention relates to an integrated flight capsule in the form of a detachable aircraft cockpit section which provides improved environmental and increased escape and survival capabilities for a pilot at both subsonic and supersonic speeds.

Considerable attention has been given to the problem of providing an ejection seat for an aircraft pilot, this seat being detachable in an emergency from the body or fuselage of the aircraft. However, it has been found that when the craft is traveling at or above sonic speed, such an ejection of the seat does not ordinarily provide adequate protection for the pilot, since he is then usually exposed to severe wind blast and to the low temperatures which are present at high altitudes.

An additional factor that requires consideration is that human responses are not generally adequate for the demands of highspeed flight. In conditions of emergency, forces may be too great or time too short for the pilot to manually perform the required ejection operations. Consequently, it is desirable that the pilot be aided by automatic or semi-automatic electronic devices. The problem is of particular importance inasmuch as the continually increasing speeds of which aircraft are capable indicates that a very high percentage of such ejection operations will occur at times when the aircraft is no longer under the control of the pilot and hence may be undergoing violent gyrations.

An ideal pilot-escape system would embody a number of features designed to improve the pilot's efficiency. For example, a so-called shirt-sleeve environment is advantageous in that it permits the pilot to ride unencumbered by protective equipment such as a pressure suit, oxygen mask, life jacket and survival gear. Furthermore, it would provide him with safe means of emergency escape at supersonic speeds, and would permit him to ride in a nearly horizontal position, which increases his resistance to gravitational forces without the use of conventional "G-Suits."

In accordance with a feature of the present invention, it is intended that the pilot will separate the cockpit section from the remainder of the aircraft in the event of an emergency during flight, and descend to earth by parachutes attached to the capsule. Although not a specific part of the present concept, it is contemplated that the cockpit section so separated will contain survival rations, tools, medical supplies, and clothing appropriate for the particular area where the flight takes place. The pilot may then remain in the capsule after landing and transmit rescue messages for an extended period of time.

The automatic or semiautomatic ejection system herein disclosed is sequenced by an electrical network incorporating a switching mechanism formed integrally with the control stick of the aircraft, this switch mechanism being a form of so-called "dead-man's" type of hand grip. It is semiautomatic in the sense that when the pilot anticipates an operational procedure in which he may become incapacitated, he will release the grip lever to initiate the ejection sequence. Consequently, the entire system remains inoperative as long as the pilot maintains his grip on the trigger-switch mechanism built into the control stick. However, should he relax this grip, either consciously or unconsciously, he will first receive both an audible and visual warning, after which, if he has not taken correction action, the escape system will operate.

All of the escape events which follow such initiation are completely automatic. For example, after a predetermined period of time following relaxation of the control stick grip, the afterburner of the aircraft is shut off, and a plurality of stabilizing fins are extended from the capsule section of the aircraft. Although their design features do not form part of the present invention, these fins may be of the "jack knife" type which open aft, and are withdrawn into the aircraft fuselage during normal flight. They are preferably extended pneumatically and are dampened hydraulically. After a further time delay to allow for deceleration of the aircraft, the escape capsule is separated from the aircraft body by some suitable means such as the electrical ignition of a number of explosive charges which are built into the fuselage and follow the line which defines the separation surface of the capsule. Such an arrangement employs high-velocity jet particles from a shaped-charge explosive or propellant to cut the aircraft structure, and hence enables the capsule to be separated with a minimum of design modification and a very low increase in over-all weight. An additional advantage achieved from the use of such a separation system is that the action is rendered more effective by the impelling force of high ram pressure within the jet engine air intake duct, and further because of the sudden increase in drag area of the unwanted portion of the aircraft fuselage.

It is important in a system of the nature being described that certain portions of the ejection sequence be delayed until the speed of the capsule has slowed to a point where the deceleration forces are capable of being met. For this reason, the herein-disclosed system further incorporates means for decelerating the capsule by extending so-called speed brakes into the airstream, these so-called speed or drag brakes being configured so as to balance the area presented to the airstream against the "q" pressures acting on them. Such speed brakes may be extended, for example, by means of a plurality of pneumatic cylinders which move the respective brake surfaces into the airstream at a rate which is effective to maintain a substantially constant reactive force. It has been found that when speed brakes of this nature are utilized, not only is deceleration of the capsule obtained but at the same time its positional stability is improved.

After the capsule has attained a predetermined rate of fall, it is further slowed by the extension of a set of parachutes. This parachute recovery system preferably comprises a deceleration chute opening below a preset altitude, and under a predetermined capsule speed, together with a cluster of, say, three main recovery parachutes opening under a preset lower speed. This parachute system is aneroid-controlled to prevent its operation above a certain altitude and to expedite such action under excessively low conditions. A system of safeguards in the form of time-delay relays are used to prevent opening of any parachute at an excessive capsule velocity to thereby preclude tearing or other damage to the chute fabric. Although again not an integral part of the present concept, a suitable form of flotation arrangement is included to facilitate pilot recovery when the capsule lands in water, since although the capsule will float without such additional equipment, the capsule canopy is not otherwise capable of being opened without flooding the cockpit.

One object of the present invention, therefore, is to provide an improved form of flight capsule designed for ejection from an aircraft traveling at sonic or supersonic speeds.

Another object of the invention is to provide an improved form of ejection capsule in which the sequence of operation of the various component devices occurs through the operation of automatic or semiautomatic control means.

A still further object of the present invention is to provide a semiautomatic pilot ejection system which utilizes a so-called "dead-man's" control stick grip, and which responds to loss of this grip by automatically cutting off the aircraft's afterburner, extending a set of speed or drag brakes, and then, after the aircraft has reached a safe speed and has descended to (or is below) a predetermined altitude, completing the separation of the escape capsule from the remainder of the aircraft fuselage, following which the sequence is completed by the extension of a parachute system.

Other objects and many of the attendant advantages of this invention will be readily appreciated as the same becomes better understood by reference to the following detailed description when considered in connection with the accompanying drawings wherein:

FIG. 1 is a schematic showing of one form of aircraft in which the ejectable capsule of the present invention may be incorporated;

FIG. 2 is an enlarged view of a portion of the aircraft of FIG. 1 with the escape capsule "skin" being omitted to illustrate in detail certain of the components making up the ejection and recovery apparatus of the invention;

FIG. 3 is a sectional view of FIG. 2 taken along the line III—III;

FIG. 4 is an exterior view of the flight capsule of FIG. 1, showing the stabilizing fins and the speed brakes extended to a position as shown in solid lines from their withdrawn position as shown by the broken lines;

FIG. 6 is a detailed showing of the manner in which the speed or drag brakes of the invention may be extended from closed to an open position; and FIG. 7 is a view of one form of parachute system suitable for use with the present invention when such system has been extended to effect deceleration of the escape capsule.

Figure 5:
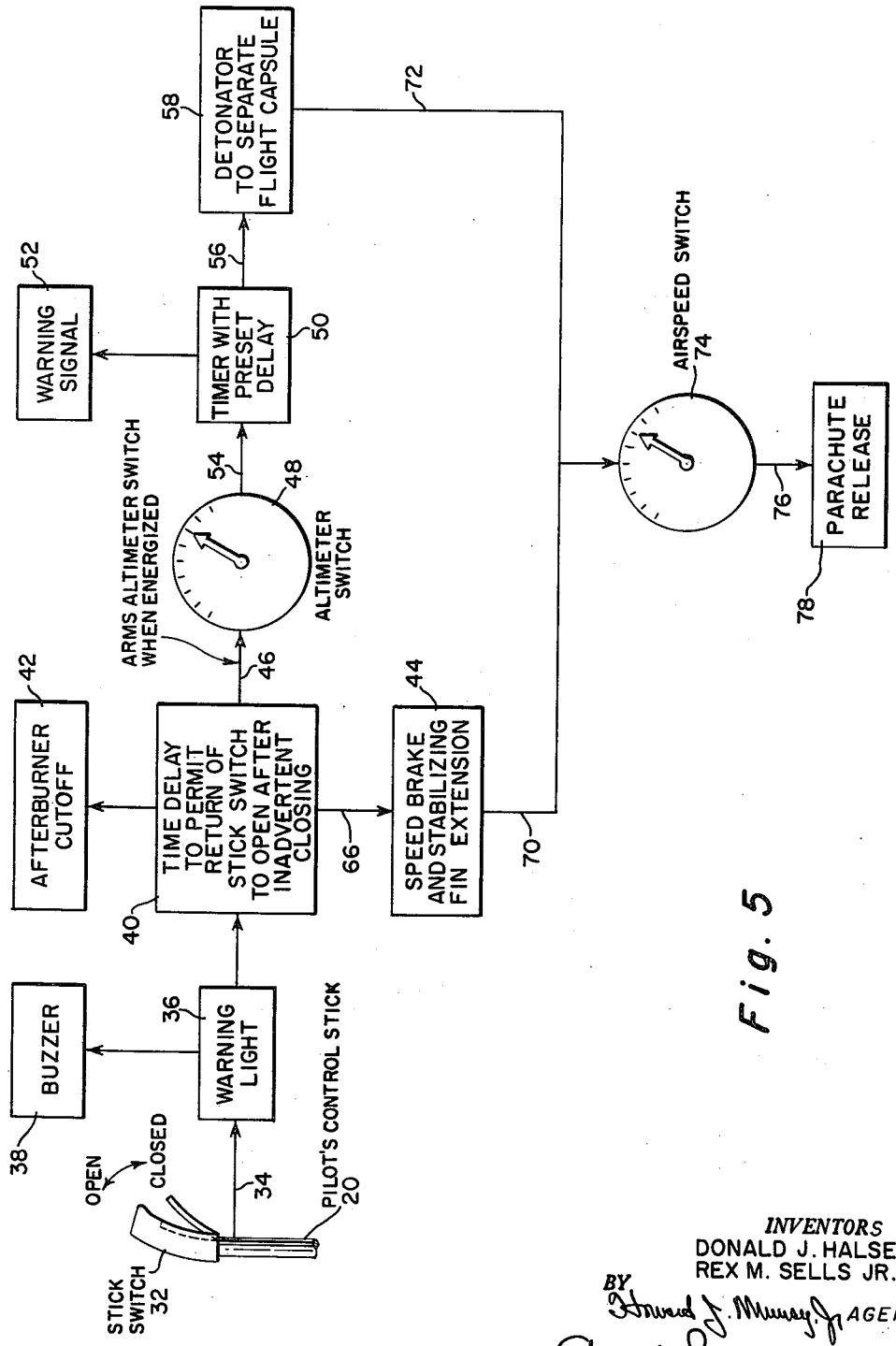
FIG. 5 is a schematic block diagram illustrating one means for bringing about the various actions which occur following the initiation of the escape sequence by the aircraft pilot.

Referring first to FIG. 1 of the drawings, there is shown an aircraft generally designated by the reference numeral 10, this aircraft 10 being formed with a nose portion designed as a detachable cockpit 12 which is intended to break away from the fuselage 14 along a line 16. Explosive charges, which may be fired electrically, are disposed along this line 16 so that when the charges are detonated, a break-away occurs between the cockpit 12 and the fuselage 14, the former then becoming an independent unit as best shown, for example, in FIGS. 4 and 7 of the drawings.

As above indicated, separation of the cockpit portion 12 of aircraft 10 (such cockpit portion to be hereinafter designated as a "flight or escape capsule") is brought about by electrical ignition of a shaped charge which is built circumferentially into the aircraft structure and follows the line 16 of FIG. 1. As a consequence, the two aircraft portions are cut apart by jet particles traveling at a high velocity to effect a clean shearing operation of all of the controls, wiring, and hydraulic lines. Furthermore, since the capsule and the fuselage are designed integrally, there are no discrete points of separation to which structural loads must be trussed. Although the constituents of this explosive charge form no part of the present invention, a particularly suitable product is the composition known as Cyclonite, which can be press-formed to any cross-section and contour.

The only structural requirement for the cockpit or capsule section 12 of the aircraft is that it have a relatively low drag coefficient and a high mass, so that both a tolerable rate of deceleration and a low peak deceleration can be obtained. Furthermore, the shape of the nose portion of the capsule should be such that its center of gravity is as far forward as possible from the stabilizing fins (later to be discussed) and well below the center of buoyancy of the unit in order to achieve flotation stability, should the capsule land upon water.

In FIGS. 2, 3 and 4 the various features of the flight capsule 12 of FIG. 1 are illustrated in greater detail. For example, FIG. 2 includes the pilot's seat 18, which may or may not include various restraining devices such as a harness (not shown). Such equipment, however, has been occasionaly found to be unnecessary to protect the pilot when the principles of the present invention are employed. The capsule 12 also incorporates the usual control stick 20, a parachute recovery unit generally identified by the reference numeral 22, suitable flotation equipment 24 and optionally a boost rocket 26 which may be utilized under certain conditions to raise the capsule 12 clear of the discarded fuselage 14 following a detonation of the charge 16.

In FIG. 4 is shown certain of the stabilizing fins 28 which, as above mentioned, are employed to prevent the separated capsule from undergoing undesirable gyrations (such as spinning about its longitudinal axis) when separation occurs under adverse conditions.

Also shown in FIG. 4 is one of the speed brakes 30, others of which are shown in FIG. 7. The function of these speed brakes 30 is to decelerate the aircarft to a point where its velocity is low enough to safely permit capsule separation and parachute extension.

Although certain individual portions of the disclosed system have been contemplated by workers in the field to which the invention pertains, the automatic ejection system of the present invention includes a number of features which permit the customary ejection seat of prior devices to be dispensed with and the incorporation of a self-locking, self-sealing canopy of the non-jettisonable type. An advantage attainable as a result of this design is that the pilot is afforded a "shirtsleeve" breathing and working environment safe from sudden and inadvertent decompression.

Referring now to FIG. 5, there is shown in schematic fashion a capsule separation system which incorporates a particular sequence of operation in order to bring about the results desired. For example, FIG. 5 includes the pilot's control stick 20 of FIG. 2, which has added thereto a switch 32 actuatable by the pilot between open and closed positions. To obtain the actions called for by the present concept, it is contemplated that the pilot of the aircraft 10 will normally grasp the stick switch 32 and maintain such switch in its electrically "open" position (but "closed" in a physical sense) so that the circuitry of FIG. 5 is deenergized. Switch 32 may thus be termed a "dead-man's" device in that, when the aircraft pilot anticipates an operational procedure in which he may become incapacitated, he will release his grip upon the control stick 20 to allow the switch 32 to move to its electrically closed position. When the pilot thus relaxes his grip upon the control stick 20 (either consciously or unconsciously) he energizes a conductor 34 to illuminate a warning light 36 and activate a buzzer 38 to yield an audible signal. At the same time, a circuit 40 is armed, this circuit 40 incorporating a time delay which permits the pilot to again grip the switch 32 and open the sequencing circuit in the event his prior relaxation of the switch was inadvertent. However, if such was not the case, the time delay built into circuit 40 (say, for example, two or three seconds) expires. At this point action is initiated to decelerate the aircraft to a point where safe capsule separation and parachute extension may take place.

As shown in FIG. 5, expiration of the time delay built into circuit 40 energizes an afterburner cutoff device 42, as well as a unit 44 which extends both the stabilizing fins 28 of FIGS. 1, 4 and 7 and the speed or drag brakes 30. At the same time, a conductor 46 is energized which leads to an altimeter switch 48 of a type designed to yield an output control signal only when the aircraft 10 is below a certain predetermined altitude, or descends to this preset level.

It is intended that when the aircraft is below this preset altitude (or when it reaches such level), a further time delay unit 50 will provide an additional period for aircraft slow-down and pilot-warning, the latter preferably being in the form of a signal 52 either of the audible or visual type, or both. As seen in FIG. 5, this timing unit 50 is energized from the altimeter switch 48 over a conductor 54.

In the event that the stick switch 32 remains electrically closed throughout the above-described sequence of events, the expiration of the delay interval built into timer 50 energizes its output conductor 56 to detonate the explosive charges built into the aircraft fuselage and hence bring about a separation of the flight capsule from the remainder of the aircraft fuselage along the line 16 of FIGS. 1, 2 and 4. This detonating system is schematically indicated in FIG. 5 by the reference numeral 58.

It is contemplated by the present disclosure that the drag brakes 30 of FIGS. 1, 4 and 7 be extended from a recessed position, where they are flush with the aircraft skin, to an extended position as shown by the solid lines in FIG. 4. Further details of this drag brake arrangement are set forth in FIG. 6, where the brakes are shown as being extended outwardly through the operation of a plurality of pneumatic cylinders 60 which receive hydraulic fluid from a reservoir 62 through a valve 64. The employment of these drag brakes 30 results in the capsule decelerating at a constant rate in the minimum time consistent with human psychological limits. Furthermore, a minimum time for deceleration confines the vertical fall to the degree that the escape episode can occur safely near ground or water level. Extension of the drag brakes 30 is accomplished by opening of the valve 64, which may be of a type subject to electrical control through a conductor 66 which is energized upon expiration of the time delay built into the unit 40 of FIG. 5. As further shown in FIG. 6, opening of the drag brakes 30 to their positon as shown in the broken lines actuates a cable 68 which may be connected to a switch (not shown) which when closed produces an electrical control variation in a conductor 70.

It is of course essential that the flight capsule 12 of the invention be provided with means for safely decelerating the same to a speed where a safe landing may be consummated. It has been found that a parachute assembly provides the most suitable means for slowing the capsule fall following separation of the latter from the remainder of the aircraft fuselage. However, deployment of the parachute unit must follow in time a separation of the capsule 12 through detonation of the explosive charge in a manner above brought out. Consequently, this separating action energizes a further conductor 72, which, together with conductor 70, leads to an airspeed switch 74. Switch 74 is armed by concurrent energization of conductors 70 and 72, but does not produce an output control signal in a conductor 76 until the flight capsule has decelerated to a preset speed, this speed being predetermined in accordance with the physical characteristics of the parachute unit 22 of FIG. 2 so that release of the parachute assembly may be safely carried out without risk of damage to the chute through excessive velocity of the capsule. Expressed differently, the airspeed switch 74 of FIG. 5 delays the release of the parachute assembly 22 of FIG. 2 until a safe capsule velocity is attained, whereupon the release mechanism 78 is actuated to eject the parachute unit into the airstream and permit it to act in the usual fashion as shown in FIG. 7 of the drawing. Although not illustrated, this parachute recovery unit may consist of a deceleration chute opening at, say, 15,000 ft., and a cluster of three main recovery parachutes opening when a capsule airspeed is reached of less than 300 knots. As above mentioned, the airspeed switch 74 is set to prevent such parachute opening at an excessive capsule velocity.

Although not an integral part of the present invention, it is further contemplated that deployment of the parachute system following actuation of the release mechanism 78 will bring about ejection and inflation of the flotation equipment 24 of FIG. 2, so that, should the landing occur upon water, the capsule will remain upon the surface until a recovery operation can be conducted. The inflation of this flotation equipment also tends to raise the capsule above the surface of the water, and thus the environment is more conducive to the pilot's safety and comfort.

Obviously many modifications and variations of the present invention are possible in the light of the above teachings. It is therefore to be understood that within the scope of the appended claims the invention may be practiced otherwise than as specifically described.

We claim:

1. In a jet aircraft incorporating an afterburner and having a closed pilot escape cockpit constituting the nose portion of said craft and detachably joined to the aft fuselage portion thereof, the nose portion of said aircraft being provided both with an extendable speed brake unit and an extendable stabilizing fin assembly, the said cockpit having therein a control stick designed to be grasped by the aircraft pilot, said control stick incorporating a switch biased to electrically closed position and movable to electrically open position when the said control stick is grasped by the aircraft pilot, an electrical circuit including said control stick switch, said circuit also including a time-delay network energized as a function of the electrical closing of said control stick switch, means operative upon the expiration of the time delay period of said network for cutting off the afterburner of said aircraft and extending both the said speed brake unit and the said stabilizing fin assembly, an electrical cockpit-separation circuit including an altimeter switch, means also effective upon the expiration of the time delay period of said network for arming said altimeter switch so that an output will be developed by the latter only when said aircraft is below a predetermined altitude, said electrical cockpit-separation circuit having a further delay network incorporated therein and receiving the output of said altimeter switch, means operating upon the expiration of the time period of said last-mentioned delay network for detaching said pilot escape cockpit from the aft-fuselage portion of said aircraft, a further electrical circuit including an airspeed switch armed as a function of both the detachment of said cockpit section from said aircraft and the extension of said speed brake unit and stabilizing fin assembly, said airspeed switch circuit yielding an output control variation only when the airspeed of said detached pilot escape cockpit is below a predetermined figure, an ejectable parachute unit carried by said escape cockpit, and means responsive to the production of an output control variation in said airspeed switch circuit for ejecting said parachute unit from said escape cockpit whereupon said parachute unit becomes effective to control the rate at which said cockpit descends.

2. The combination of claim 1, further including both visual and audible pilot-warning means forming part of the circuit energized as a function of the electrical closing of said control stick switch.

3. The combination of claim 1, further including pilot-warning means energized as a function of the production of an output control signal from said altimeter switch.

4. The combination of claim 1, in which said first-mentioned time-delay network is effective to deactivate the said first-mentioned electrical circuit upon the electrical opening of said control stick switch following the electrical closing thereof and prior to the expiration of the time delay period of said network.

5. In an aircraft designed with a closed pilot escape cockpit constituting the nose portion of said craft and detachably joined to the aft fuselage portion thereof, said cockpit having selectively extendable stabilizing and speed-retarding airfoils and carrying therein a selectively ejectable parachute recovery unit, circuit means initially energizable by the pilot of said aircraft for extending such stabilizing and speed-retarding airfoils a predetermined period of time following such initial energization, said crcuit means also acting to effect the detachment of said escape cockpit from the fuselage portion of said aircraft after a predetermined period of time provided that the aircraft is then below a preselected altitude, airspeed switch means activated by the concurrent detachment of said escape cockpit and the extension of said stabilizing and speed-retarding airfoils, said airspeed switch acting to control the ejection of said parachute recovery unit from said detached cockpit when the airspeed of the latter is below a preselected figure.

6. The combination of claim 5, in which said circuit means initially energized by the pilot of said aircraft includes a switch biased to electrically closed position and normally maintained in electrically open position by the pilot during flight.

References Cited in the file of this patent

UNITED STATES PATENTS

| | | |
|---|---|---|
| 2,439,750 | Nesbbit et al. | Apr. 13, 1948 |
| 2,445,400 | Johnston | July 20, 1948 |
| 2,591,867 | Prower et al. | Apr. 8, 1952 |
| 2,702,680 | Heineman et al. | Feb. 22, 1955 |
| 2,969,212 | Martin | Jan. 24, 1961 |

FOREIGN PATENTS

| | | |
|---|---|---|
| 1,158,537 | France | Jan. 27, 1958 |